United States Patent
Katayama et al.

(10) Patent No.: US 6,704,415 B1
(45) Date of Patent: Mar. 9, 2004

(54) ECHO CANCELER

(75) Inventors: Hiroshi Katayama, Kawasaki (JP);
Yasushi Yamazaki, Kawasaki (JP);
Hitoshi Matsuzawa, Kawasaki (JP);
Yoshihiro Tomita, Kawasaki (JP);
Mutsumi Saito, Fukuoka (JP);
Hisanari Kimura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/354,185

(22) Filed: Jul. 15, 1999

(30) Foreign Application Priority Data

Sep. 18, 1998 (JP) ............................................. 10-263838

(51) Int. Cl.$^7$ .......................... H04M 1/00; H04M 9/00; H04M 9/08
(52) U.S. Cl. ............................. 379/406.01; 379/406.07; 379/406.08; 379/390.01
(58) Field of Search ....................... 379/387.01–390.04, 379/395–395.01, 406.01–406.16

(56) References Cited

U.S. PATENT DOCUMENTS 6,282,176 B1 * 8/2001 Hemkumar

FOREIGN PATENT DOCUMENTS

| JP | 6-216811 | 8/1994 |
|----|----------|--------|
| JP | 7-297901 | 11/1995 |

* cited by examiner

*Primary Examiner*—Duc Nguyen
(74) *Attorney, Agent, or Firm*—Katten Muchin Zavis Rosenman

(57) ABSTRACT

An echo canceler makes it possible to adaptably control a power of speech reception voice and to reduce distortion of a voice output from a speaker. The echo canceler has a basic structure includes a power control section controlling a power for a speech reception voice, a first filtering section removing a particular component from an output of the power control section, an echo canceling section removing echo components of a speech reception voice, which are added to a speech transmission voice, a second filtering section filtering particular components of the speech reception and transmission voices, and a state judgement section judging existences of the speech reception and transmission voices from an output of the second filtering section and controlling a power attenuation amount of the power control section based on the judgement result.

19 Claims, 8 Drawing Sheets

Method of determining the final mute amount (G)
- $G = \alpha * (P_x - P_{max})$
  (Where, $-1.0 \leq G \leq TH2$)
- When R1 power < TH1, $G = \beta$ $(-1.0 \leq \beta, TH2 \leq 0.0)$
$(\alpha \geq 0.0)$
($P_{max}$: Maximum power)

Voice detection by the use of filters

A basic structure of echo canceler

Voice detection by the use of low pass components

Voice detection by the use of high pass components

ECHO CANCELER

BACKGROUND OF THE INVENTION

1. Field of the Invention

The present invention relates to an echo canceler, which cancels echoes generated during hands free speaking on a cellular telephone.

2. Description of the Related Art

Echoes generated during the hands free speaking mean that a speech reception voice generated from a speaker of communication equipment is re-input to a microphone and is transmitted as echoes to a far end talker through a transmission circuit.

Therefore, it is required to prevent from transmitting the speech reception voice through the transmission circuit back to the far end talker at receiving equipment. To purse the requirement, it is necessary to develop an echo canceling technique.

The Japanese laid-open patent application No. 7-297901 describes as one of conventional techniques, voice communication equipment with an echo canceler to cancel echoes generated during the hands free talking.

It is possible to cancel the echoes by estimating and subtracting echoes included in a speech transmission signal from a speech reception voice. In the echo canceling technique, described in the Japanese patent publication No. 7-297901, a variable attenuator is activated to fix the transmission signal level at the hands free speaking but not during the both far end and near end concurrently speak so that noise level is sent and unnatural feeling is given to the far end talker.

Further, the other technique relating to an echo canceler to cancel the echoes generated during the hands free speaking is described in the Japanese laid-open patent application No. 6-216811. It is an object of the technique is to solve a problem such that distortion of the speech voice signal occurs when a speech reception voice signal, of which level is large, is input, thus the echo signal can not be canceled sufficiently at a speech transmission signal path.

To achieve the object, in the description of the Japanese laid-open patent application No. 6-216811, the speech reception voice signal level is limited to a predetermined amplitude level or less before the voice signal is supplied to an echo canceler and a speaker. However, there are some cases where the limitation of signal level gives an influence not preferable for the voice signal output from the speaker.

SUMMARY OF THE INVENTION

Accordingly, it is an object of the present invention to provide an echo canceler to improve preferable echo canceling, which is not improved sufficiently by the conventional techniques.

It is another object of the present invention to provide an echo canceler whereby a speech reception voice power can be adaptably controlled and the distortion of voice output from a speaker can be reduced.

It is further object of the present invention to provide an echo canceler to improve a stable echo canceling operation by attenuating a voice input to the echo canceler, varying the attenuation amount, and removing the distortion of the voice data.

It is furthermore object of the present invention to provide an echo canceler for general use, which does not depend on the delay amount and gain of an echo pass by automatically measuring echo pass delay, echo pass gain and clipping state in an analog circuit.

To achieve the above-described objects according to the present invention, an echo canceler comprising, a power control section controlling a power for a speech reception voice, a first filtering section removing a particular frequency component from an output of the power control section, an echo canceling section removing echo components of a speech reception voice, which are added to a speech transmission voice, a second filtering section removing the particular frequency components of the transmission voices which include echo, and a state judgement section judging existences of the speech reception and transmission voices from an output of the second filtering section and controlling a power attenuation amount of the power control section based on the judgement result.

In one preferred mode of the present invention, the state judgement section calculates the result of judging whether or not the speech reception and transmission voices exist and a power of the speech reception voice of N samples, based on N samples of the speech reception voice and the output from the second filtering section, and there is comprised of a delay buffer maintaining the calculated result of the judgement section and the power of the speech reception voice for T blocks, each block having N samples.

In the above-described structure, the state judgement section controls to make the power control of the power control section operable, when both the speech reception and transmission voices exist.

In the other mode of the present invention, the state judgement section makes the attenuation amount obtained by the power control of the power control section at the time when either of the speech reception or transmission voice does not exist smaller than that at the time when both of the speech reception and transmission voices exist.

Additionally, the echo canceling section estimates a echo replica according to an attenuated signal obtained by attenuating an input signal to the echo canceling section, amplifies the estimated echo replica according to the attenuation of the input signal, and subtracts the amplified echo replica amplified from the input signal.

Further, objects of the present invention will become clear by the description for explaining embodiments according to the attached drawings.

BRIEF DESCRIPTION OF THE PRESENT INVENTION

DESCRIPTION OF THE PREFERRED EMBODIMENTS

Figure 1:
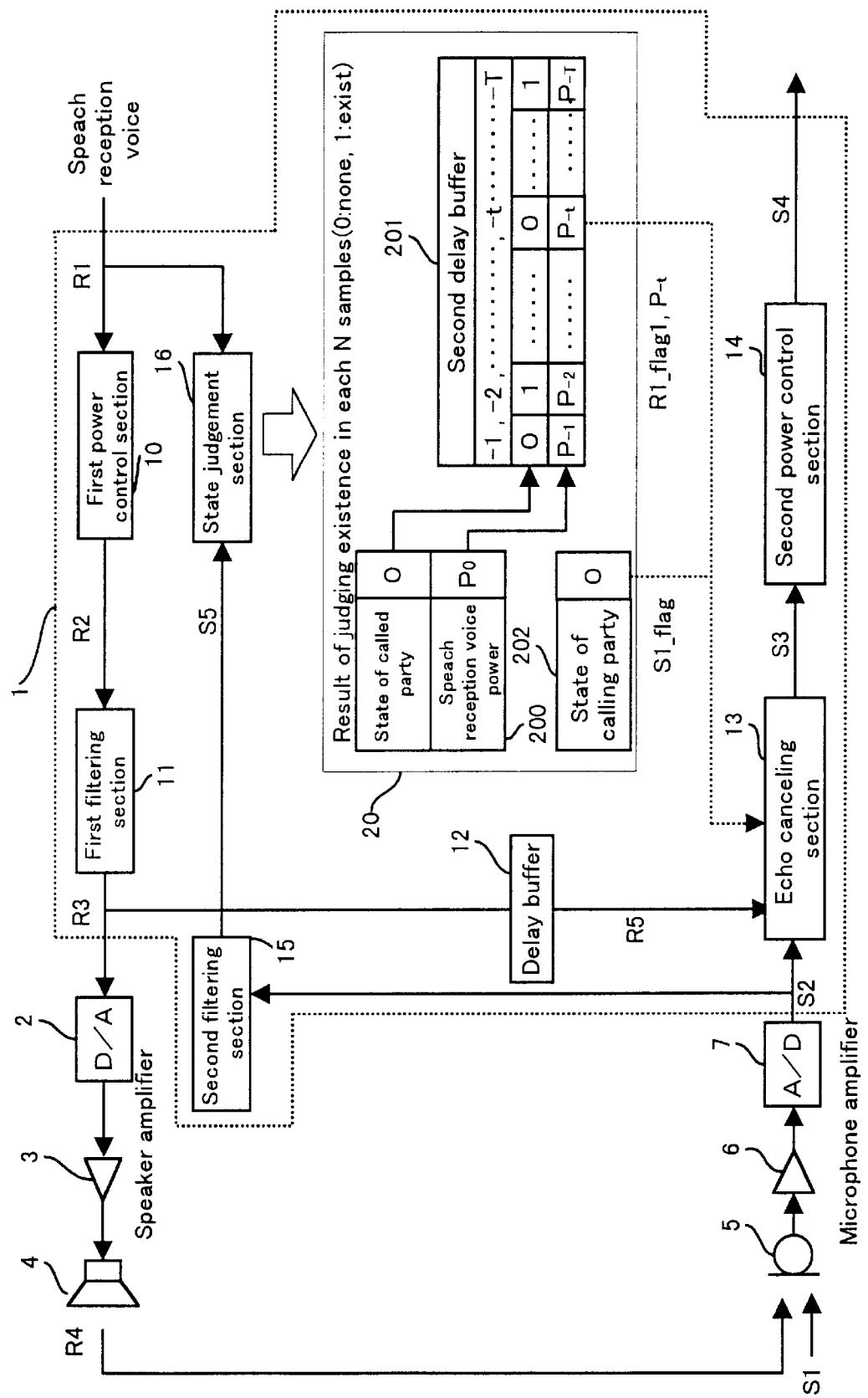
FIG. 1 is a block diagram showing a basic structure of an echo canceler according to the present invention.

Hereinafter, preferred embodiments of the present invention will be described in reference to the drawings. Throughout the attached drawings, the same reference numerals and symbols are used to denote corresponding or identical components.

FIG. 1 is a block diagram showing a basic structure of an echo canceler according to the present invention. A section enclosed by a broken line 1 is a basic structural section of the echo canceler, which is comprised of a digital signal processor (DSP) 1 as an embodiment.

A digital-analog converter 2 converts a speech reception voice signal (R3) output from the DSP 1 to an analog voice signal, and a speaker 4 inputs the converted signal via a speaker amplifier 3, and outputs it as an output voice (R4).

On the other hand, a microphone amplifier 6 amplifies a speech transmission voice (S1) input to a microphone 5, and an analog-digital converter 7 converts the speech transmission voice (S1) to a digital voice signal, and DSP 1 inputs it as a speech transmission voice signal (S2).

In the embodiment, a part of the voice (R4) output from the speaker 4 is circulated to the microphone 5 and becomes an echo. Therefore, the DSP 1 including an echo canceling function cancels the echo circulated to the microphone 5.

A speech reception voice (R1) is input to a first power control section 10 of the DSP 1. The power control section 10 calculates a final attenuation amount (G), according to a method shown in FIG. 2, based on a speech reception voice power ($P_O$), and attenuates the speech reception voice (R1).

This is because to avoid the echo not to be removed when an excessive signal is input as input signals (R5, S2) of the echo canceling section 13.

Figure 2:
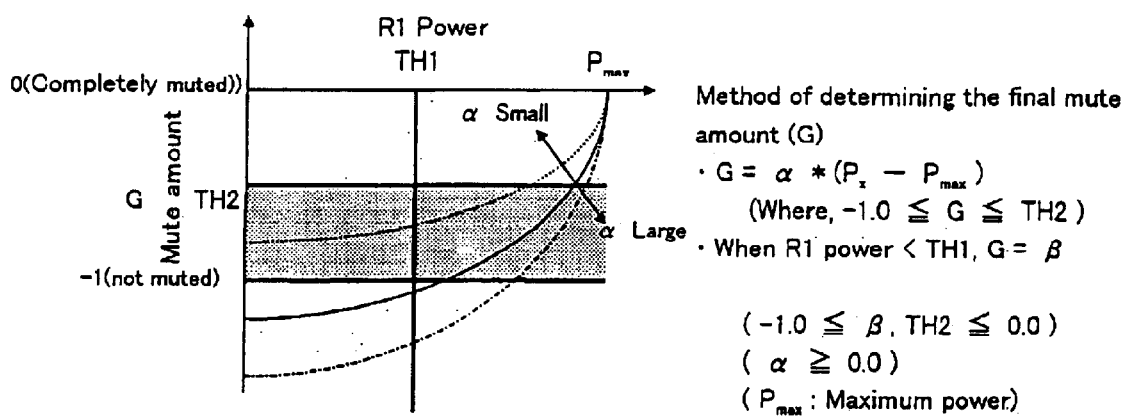
FIG. 2 shows a characteristic curve for power control by showing a mute amount (attenuation amount G) on the vertical axis and a speech reception voice power ($P_x$) on the horizontal axis.

Contents of power control of the speech reception voice (R1) in the first power control section 10 will be now explained in accompanying with FIG. 2. FIG. 2 shows a characteristic curve for power control by showing a mute amount (attenuation amount G) on the vertical axis and a speech reception voice power ($P_x$) on the horizontal axis.

When the speech reception voice power ($P_x$) is the maximum value, i.e., $P_x = P_{max}$ ($P_{max}$ is a maximum value which can express in DSP1), the attenuation amount G becomes zero. It means the speech reception voice can be completely muted.

The characteristic curve of the power control can be expressed by an equation $G = \alpha(P_x - P_{max})$. That means as the smaller becomes the speech transmission voice power ($P_x$), the final attenuation amount (G) becomes smaller (when G=−1.0, the power control section 10 does not attenuate at all).

However, the voice power is not over-amplified or over-attenuated under the condition of $-1.0 \leq G \leq TH2$, where $TH2 \leq 0.0$, so as not to give unnatural feeling to the voice (R4) output from the speaker.

Additionally, when the power of the speech reception voice (R1) is less than a threshold TH1, the amount G is a fixed value β, but $-1.0 \leq \beta$ and $TH2 \leq 0.0$.

Figure 3:
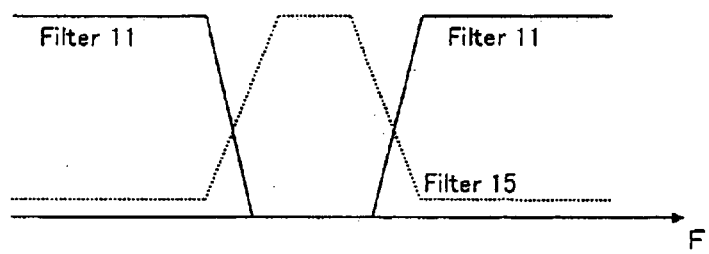
FIG. 3 shows a filtering characteristic of a first filtering section 11.

Then, the voice signal (R2) output from the first power control section 10 is input to a first filtering section 11, characteristic frequency components of the output voice signal (R2) of FIG. 3 are removed (as a frequency characteristic shown by a solid line of FIG. 3), and high and low frequency components of the output voice signal (R2) remain. This is because the first filtering section performs judgement of existence of the speech transmission voice (S1) in the latter-described second filtering section 15.

The digital-analog converter 2 converts the signal (R3) output from the first filtering section 11 to an analog signal. Then, the speaker amplifier 3 amplifies the converted analog signal, and the speaker 4 outputs the analog signal as the output voice (R4).

Concurrently, the signal (R3) output from the first filtering section 11 is input to a first delay buffer 12, and is maintained during a constant period. The voice (R4) output from the speaker is input to the microphone 5 along with the speech transmission voice (S1), is amplified by the microphone amplifier 6, and is converted to a digital speech transmission voice signal (S2) by the analog-digital converter 7.

The digital speech transmission voice signal (S2) is input to the second filtering section 15 having a pass area characteristic, which is reversed to that of the above-described first filtering section 11 shown in FIG. 3 (refer to a frequency characteristic shown by a broken line of FIG. 3). A signal (S5) output from the second filtering section 15 is input to a state judgement section 16.

The state judgement section 16 judges the existence of the digital speech transmission signal (S2). In other words, characteristic frequency components are clipped in the first filtering section 11 relating to the echo of the output voice (R4). Therefore, the power of the echo components in the signal (S5) passed through the second filtering section 15 is exhausted almost to nothing.

On the contrary, all components of the speech transmission voice (S1) remain, because the speech transmission voice (S1) is not passed through the first filtering section 11. Therefore, when the speech transmission voice (S1) exists, the signal power output from the second filtering section 15 becomes larger.

On the other hand, the digital speech transmission voice signal (S2) output from the analog-digital converter 7 is input to the echo canceling section 13, and the echo canceling process is executed for the digital speech transmission voice signal (S2), based on the output signal (R5) from the above-described delay buffer 12.

Figure 4:
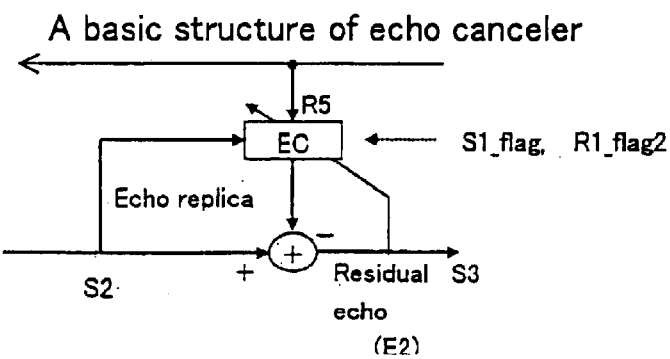
FIG. 4 is an explanatory diagram of one structure of an echo canceling section 13.

In other words, as shown in FIG. 4, the echo canceling section 13 estimates echo components of the output voice (R4) based on the output signal (R5) of the delay buffer 12 (Hereinafter, the echo components are referred as echo (R4)). The estimated echo is called an echo replica (E1).

Then, the echo replica (E1) is subtracted from the digital speech transmission voice signal (S2). Thereby, the echo (R4) can be removed from the digital speech transmission voice signal (S2) including the speech transmission voice (Si)+the echo (R4).

However, since the echo (R4) is varied according to a frequency characteristic or an echo pass characteristic including speaker 4, microphone 5, and roomacoustics, it is difficult to estimate the complete echo (E1=R4). Therefore, it is required to update an internal state of the echo canceling section 13 to cope with the varied echo, based on a residual echo (E2) and the speech reception voice signal (R5).

The echo canceling section 13 removes the echoes, as updating the internal state and subtracting the echo replica (E1) from the input signal (S2). These processes are executed by the control of ON or OFF as shown in the following table 1:

TABLE 1

Control of Echo canceler

| S1_flag | R1_flag | ON/OFF SUBTRACTION | UPDATE | REMARKS |
|---|---|---|---|---|
| 1 | 1 | ON | ON/OFF | |
| 1 | 0 | OFF | OFF | |
| 0 | 1 | ON | ON | |
| 0 | 0 | OFF | OFF | |

In other words, in the above table 1, since the echo does not occur, when the speech reception voice (R1) does not exist (R1_flag=0), neither updating nor subtraction process is executed (OFF, OFF). On the other hand, since it is judged that only components of echo (R4) exists, when only the speech reception voice (R1) exists (S1_flag=0, R1_flag=1) both updating and subtraction processes are executed (ON, ON).

During double talk, i.e., at the time when both of the speech reception voice (R1) and the speech transmission voice (S1) exist at a state of S1_flag=1 and R1_flag=1, only subtraction process is executed and the updating process is stopped, generally (ON/OFF). In this case, as described above, the echo (R4) is removed from the input signal (S2) and only the speech transmission voice (S1) is output by estimating the echo replica (E1), based on the speech reception voice signal (R5) output from the delay buffer 12. Therefore, the speech transmission voice (S1) remains in the residual echo (E2).

On the contrary, since the updating process of the internal state is executed, based on the residual echo (E2) and the speech reception signal (R5), the speech transmission voice (S1) gives an influence on updating the internal state, when the speech transmission voice (S1) exists. Therefore, the internal state does not become optimal, thus the echo estimation can not be executed.

However, there are some cases that updating process may be rather performed regularly, according to the echo pass characteristic, more particularly, at the time when the echo pass gain is large (R4>>S1). Therefore, it is suitable to use a structure where the switch ON or OFF can be controlled to update the internal state during double talk.

Further, the echo canceled voice signal (S3) is input to the second power control section 14 to decrease the echoes, which are not removed in the echo canceling section 13, according to the changes of the speech reception voice (R1) or the echo pass characteristic. The control shown in a table 2 is performed according to the results of the judgement whether the speech reception voice (R1) and the speech transmission voice (S1) exist or not (S1_flag, R1_flag) as follows:

TABLE 2

Control by Power control section 2

| S1_flag | R1_flag | ON/OFF | REMARKS |
|---|---|---|---|
| 1 | 1 | ON | Fixed mute amount γ |
| 1 | 0 | OFF | |
| 0 | 1 | ON | The same way as the power control section 1 |
| 0 | 0 | OFF | |

In other words, when there is no speech reception voice (R1), i.e., R2_flagl=0, attenuation is not performed (OFF) because there is no echo (R4). When there is only the speech reception voice (Ri), i.e., S1_flag=0 and R1_flag1=1, the signal (S2) input to the echo canceling section 13 is regarded as only echo, and an attenuation control process is performed, similar to the control of the first power control section 10, as described in FIG. 2.

During double talk, the attenuation amount is fixed (a fixed mute amount: γ). It is required to keep the speech transmission voice (S1) natural to a certain extent. Therefore, when the attenuation amount is determined by the speech reception voice power, the power of speech transmission voice (S1) is also varied when the speech reception voice is large, the attenuation is also large, and in some cases, the voice can not be heard. Therefore, the attenuation amount is fixed.

On the other hand, the speech reception voice (R1) and the voice signal (S5) output from the second filtering section 15 are input to the state judgement section 16 in FIG. 1. The state judgement section 16 judges whether the speech reception voice (R1) and the speech transmission voice (S1) exist or not, according to the power in each N sample, as shown in an approximate structure 20.

The above described (S1_flag, R1_flag1) are calculated from the result, and the calculated result is transmitted to the echo canceling section 13. In here, when the calculated power is equal to or more than the threshold value, the existence of voice is determined set as "1", while no existence of voice is determined set as "0", when the power is less than the threshold value.

Additionally, the average power ($P_0$) of the N samples of the speech reception voice (R1) is calculated, and is set in a register 200. R1_flag and $P_0$ are transmitted to a second delay buffer 201, and data for the previous T blocks (one block has N samples) are stored therein.

There is a time gap between the signal (R3) output from the first filtering section 11 and the signal (S2) output from the microphone 5, according to the delay processed in the digital-analog converter 2 and analog-digital converter 7 or delays of the analog circuit, such as an amplifier, and the echo pass. The time gap is absorbed by delaying data by the use of the delay buffer 12 and the second buffer 201.

In the above-described basic structure according to the present invention, there is a possibility that the voice signal (R2) output from the first power control section 10 influences on the voice output from the speaker. Therefore, as the attenuation amount of the power control section 10 becomes larger, the voice output from the speaker becomes small, thus it makes difficult to hear the voice.

Since the average power ($P_0$) becomes small, when no speech reception voice (R1) exists, the attenuation amount can be reduced, or no attenuation process may be executed. Alternatively, although echoes generates when only the speech reception voice (R1) exists, the second power control section 14 can perform attenuation, thus making it possible to cope with the problem even when the first power control section 10 does not perform attenuation.

Since the speech transmission voice (S1) is also attenuated when the second power control section 14 attenuates largely during double talk, i.e., at the time where both of the speech reception voice (R1) and the speech transmission voice (S1) exist, the attenuation amount of the power control section 14 can not be large, and therefore, it is preferable to attenuate the power in the first power controller 10 as possible.

Figure 5:
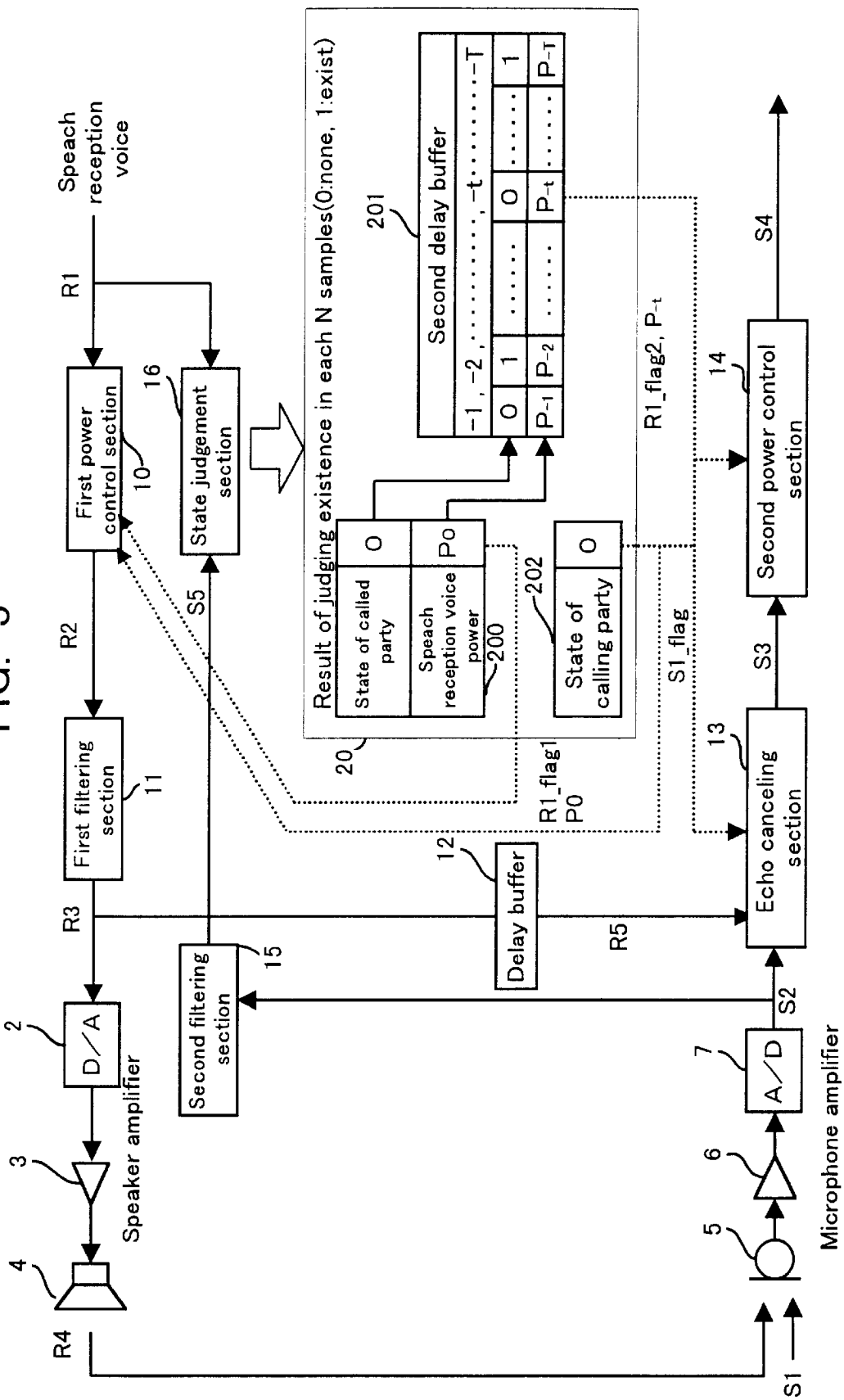
FIG. 5 is a structural block diagram of an echo canceler containing power control function by the use of double talk mode.

Accordingly, as shown in the structural example of FIG. 5, the speech reception voice (R1) can be output, as it is, by setting the attenuation amount to −1.0 in the first power control section 10, not during double talk, according to the result of judgement of the existence of the speech transmission voice (S1) and the speech reception voice (R1) (S1_flag and R1_flag).

However, it is required to set the attenuation amount of the second power control section 14 enough large to remove the echoes according to the result of judgement of the existence (R1_flag2), when only the speech reception voice (R1) exists. Thereby, the voice output from the speaker does not become small because the speech reception voice (R1) only be attenuated during double talk.

Although there is a possibility that the voice output from the speaker becomes small during double talk, no influence occurs even if the voice output from the speaker becomes small because there is a few cases that near end talk can hear well the voice of far end talker while near end talker is talking. In FIG. 2, setting the attenuation amount to −1.0 can be easily realized by setting the threshold value TH2 to −1.0, and therefore, it becomes possible to select either way if the threshold value TH2 can be set from the externally provided device in this structure.

In the above-described embodiment, unnatural feeling may be given because the voice output from the speaker is varied a little at a switching time when performing the power control only during double talk. However, it is possible to control the attenuation amount so as to change smoothly, based on the speech reception voice, without fixing the attenuation amount to −1.0 not during double talk.

For example, the characteristic coefficient a is set to a smaller value during double talk, and is set to a larger value not during double talk. Thereby, the attenuation becomes large because the attenuation amount (G) is close to zero during double talk, while the attenuation amount is close to −1.0 not during double talk. Therefore, the power fluctuation becomes small, when switching the double talk time and the other time.

Therefore, a natural voice can be output not giving unnatural feeling at the switching time of the voice output from the speaker.

Figure 6:
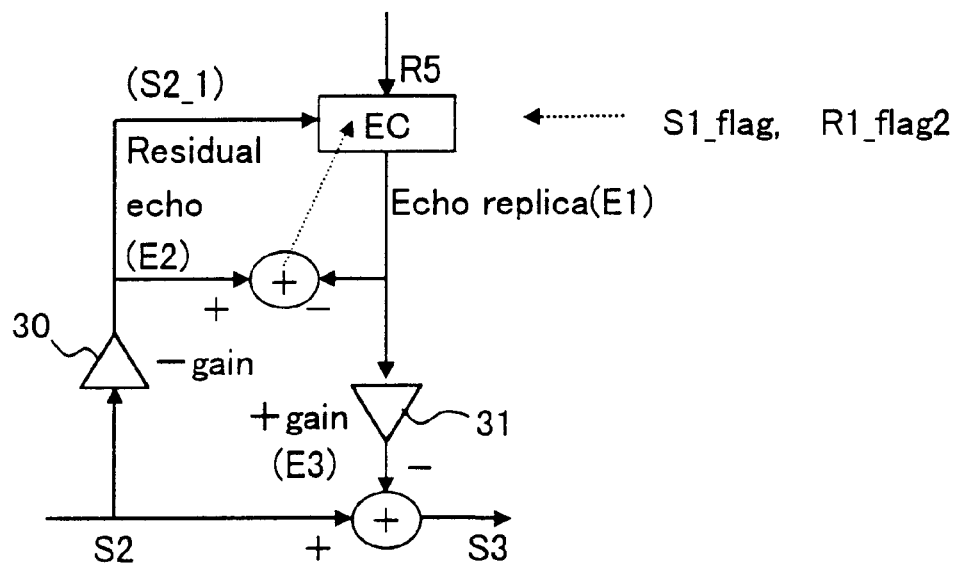
FIG. 6 is an explanation diagram of the other structural example of the echo canceling section 13.

FIG. 6 is a structural example of the echo canceling section 13 according to the other embodiment of the present invention. When realizing echo canceling in a cellular telephone device, it becomes very important to make the device be compact and to make the consumption power be lower. However, when the DSP 1 is activated in fixed points, only numerals within a specific range can be expressed inside the DSP 1. For example, the expressive range is between −1.0 to 1.0.

On the other hand, when the echo canceler is applied to a sound reinforcement telephone, the speech transmission voice signal (S2), which is input to the echo canceling section 13, becomes larger than the speech reception voice signal (R3) output from the first filtering section 11, of which echo pass gain becomes larger than 0 dB.

Accordingly, when the speech reception voice signal (R3) becomes larger, the speech transmission voice signal (S2), which is input to the echo canceling section 13, further becomes larger. Therefore, it may well be that the data value to be processed in the echo-canceling block 13 is exceeded the range expressible in the DSP 1. If a clip occurs when the data value is exceeded the expressible range, the echo canceling process can not be almost performed. Although the data value can be imitatively expressed in floating points, a number of calculations are considerably increased.

To cope the problem, a gain controller 30 attenuates (−gain) the speech transmission voice signal (S2), which is input to the echo canceling section 13, and absorbs the increment or decrement of the echo pass gain, as shown in FIG. 6. Thereby, it becomes possible to prevent the data to be processed in the DSP 1 from being outside the expression range.

Thereby, it also becomes possible to realize the echo canceling in the DSP 1 activated with fixed points, without depending on the echo pass gain. The echo replica (E1) can be calculated by employing the attenuated signal (S2_1) and the output signal (R5) from the delay buffer 12 to activate the echo canceling section 13.

The internal state of the echo canceling section 13 is updated by employing the residual echo (E2) obtained by subtracting the echo replica (E1) from the attenuation signal (S2_1). The signal (S3) output from the echo canceling section 13 is calculated by subtracting the signal (E3), which the gain control means 31 amplifies (+gain) the echo replica (E1), from the input signal (S2) before the attenuation, to adjust the output signal level.

When considering a group, of which echo pass gain is extremely different, for example, a case of applying a line echo canceler to a hands free telephone, the DSP 1 is available regardless of the echo pass gain, if a gain control circuit, not shown in the diagram, can adjust the echo pass gain.

In here, as the other example shown in FIG. 6, when only the speech reception voice (R1) exists and the gain control means 31 amplifies (+gain) the echo replica (E1), the characteristic can be kept by reflecting the power of the residual echo (E2), when the echo cancel can not follow well.

When only the speech reception voice (R1) exists, the residual echo (E2) should be zero, when the echo canceler can follow well and cancels the echoes securely. Then, when the signal (S2) input to the echo canceling section 13 is compared with the power of the echo replica (E1) and the signal (S2) is larger than the signal power amplified (+gain) from the echo replica (E1), the echo replica (E1) is increased by "gain+the power of E2". On the contrary, the echo replica (E1) is increased by "gain−the power of E2", thus it makes possible to assist the echo canceling, when the echo canceler can not follow well.

In the structure of FIG. 6, it may be modified as to switch the above described two examples. The output of the echo canceling section 13 is monitored to select a smaller power.

Additionally, either method can be selected by a switching signal sent from the user. Since the signal, of which echoes can be removed at the echo canceling process when only the speech reception voice exists, can be selected, the characteristic may be improved.

In the embodiment of FIG. 6, there are many cases where a user can change the gain value of the speaker amplifier 3 by changing volumes, not shown in the diagram. Consequently, it can be prevented that the data is exceeded the expressible range in the DSP 1, regardless of the volume value, if the gain value is set at the maximum value of the volume. In other words, the gain value (+gain) of the gain controller 30 may be adjusted so that the volume value at the maximum is within the expressible range.

The gain value can be also varied according to the volume value. In other words, the characteristic of the echo canceler can be improved by making the gain be large, when the volume level becomes large, and making the gain value be small, when the volume level becomes small.

In other words, the characteristic can be further improved by setting the maximum value of the gain from the maximum value of volume and varying the gain according to the volume value after that.

There is a case where the volume value is not continuously changed, but is changed by steps. In this case, a number of calculations can be reduced by changing with the use of an arithmetic shift process than by multiplying the gain (real numbers) to the signal (S2) input to the echo canceling section 13, because the numeral has exponential section and mantissa, when the numeral is exceeded the expressible range at the time the DSP 1 activated in fixed points is employed.

As the other way, the gain values for each volume value are tabled and stored in a ROM, and the corresponding value is read out. Thereby, a number of calculations can be further reduced.

When the gain control section 31 amplifies the echo replica (E1) in a digital process of the echo canceling section 13, "0" data is inserted to a lower bit of the data for the amplified echoes. The data is subtracted from the input signal (S2), and therefore, the lower bit (the attenuation amount is depending on the gain) remains, as it is.

When almost callers talk at a position apart from the speaker 4 and the microphone 5 and gains of the speaker and microphone are increased, there would be a high possibility that noises around the place are easily taken and many noise components are included in the lower bits of the input voice signal (S2).

The echo components included in the lower bit may be output, as they are. Then, in the structure of the echo canceling section 13 shown in FIG. 7, the echo replica (E1) is subtracted from the input signal (S2_1) after amplified by the gain control means 30. The gain control means 32 amplifies the subtracted signal for the gains attenuated by the gain control section 30. Thereby, the echo and noise components included in the lower bits can be removed.

Figure 7:
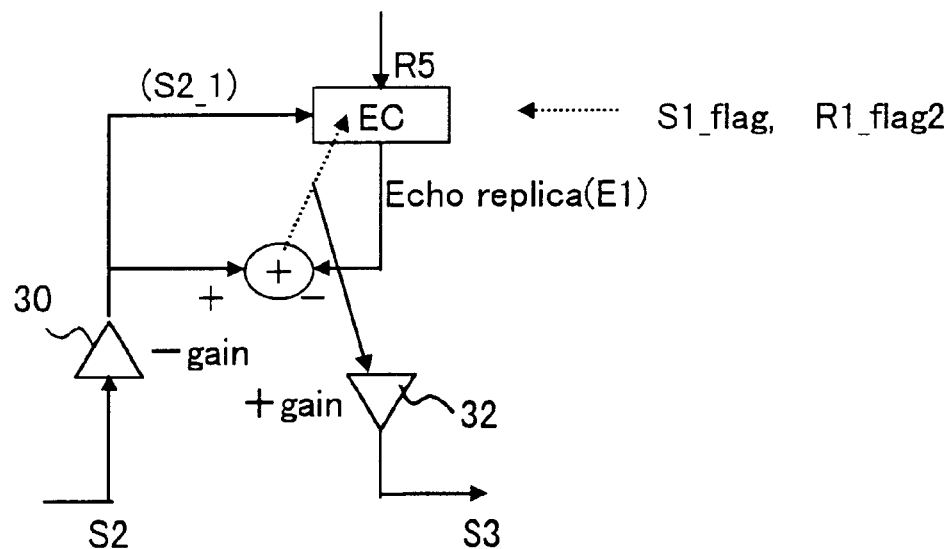
FIG. 7 is an explanation diagram of the other structural example of the echo canceling section 13.

This structure of FIG. 7 can be also composed of the gain control means 32 which amplifies (+gain) in the second power control section 14. Thereby, the program or circuit size of the echo canceling section 13 can be reduced.

Additionally, in the above-described embodiments, the lower bit of the speech transmission voice (S1) can be deleted by disregarding the lower bits during double talk. Therefore, the small power part of the speech transmission voice (S1) is clipped in an environment where a few noises exist, the head or end of the voice is clipped, and therefore, a voice signal quality is deteriorated.

Figure 8:
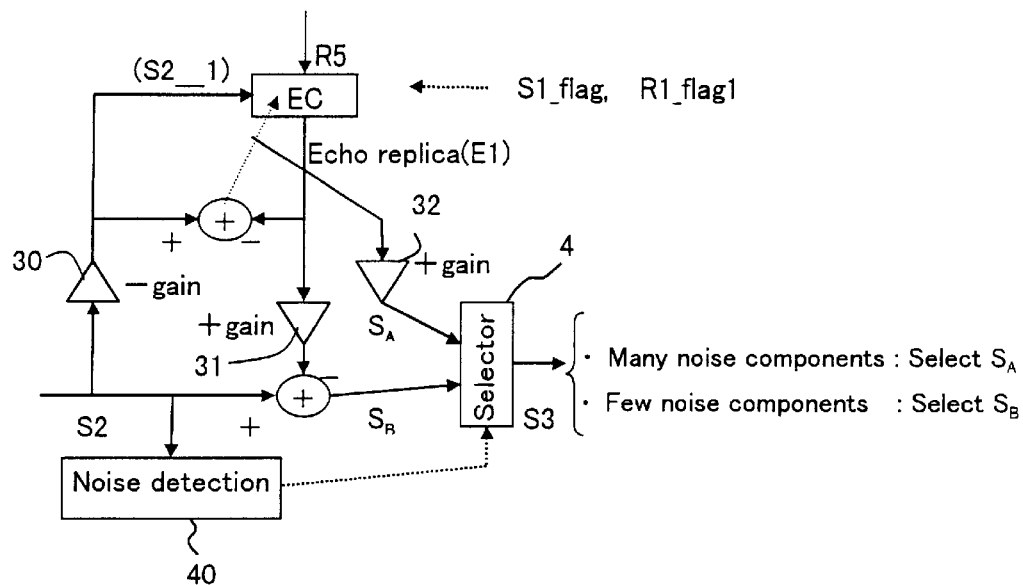
FIG. 8 is the other explanation diagram of the other structural example of the echo canceling section 13.

To cover the shortage, a voice having a good quality can be output by switching the result of the judgement of existence of the speech reception voice (R1) and the speech transmission voice (S1) and a result of detecting the noise of the signal (S2) input to the echo canceling section 13, as shown in FIG. 8.

In FIG. 8, a noise detecting section 40 detects the size of the noise components by using a linear prediction coefficient technique. Then, a selector 41 performs selection according to the size of noise component on the following basis of:

(1) an output $S_A$ of the gain controller 32 is selected when there are many noise components;

(2) an output $S_A$ of the gain controller 32 is selected when the noise components are few during single talk; and (3) a $S_B$, which is a difference between the input signal (S2) and the output of the gain control means 31, is selected, when the noise components are few during double talk.

Thereby, the selector can select either process of removing noises as possible, when there are many noise and echo components, or attaching importance to voice quality, when there are a few noise components.

Returning back to FIG. 1, a number of calculations in the state judgement section 16 can be reduced, removing the echoes by changing the N sample value, which is a basis of the judgement, according to the double talk mode in the state judgement section 16.

For example, the following ability can be improved by making the N sample value be small when frequently repeating the double talk mode and the single talk mode to switch in a short interval. When the soundless mode is continued, the sample value N is made to be large so as to suppress the process amount.

In FIG. 1, the delay in a digital-analog converter 2, an analog-digital converter 7, and analog circuits of amplifiers 3 or 6 can be easily absorbed by varying the delay amounts t of the delay buffers 12 and 201. Additionally, the echo canceler can follow the change of the echo pass, i.e., echo delay, by estimating the delay amount t automatically during a talk.

When it is judged that only the speech reception voice (R1) exists in the state judgement section 16, the change of the speech transmission voice (S2) input from the microphone 5 is monitored by employing the change of speech reception voice, i.e., a time when the voice exists, as a basic point. The delay amount t can be calculated from the time difference at the time when the changes are coincident.

Further, a circuit, not shown in the diagram generates a tone signal in a band the filtering section 15 passes from the speaker 4. Therefore, the delay time t can be calculated from the time difference to the time when the tone signal that is output from the filtering section 15 is changed. In this case, the tone signal power output from the speaker 4 is compared with the power input from the microphone 5 to estimate the echo gain. Then, the estimated gain value is reflected to the gain value in the echo canceling section 13.

In other words, a number of delay samples [(T1−T0) samples] is obtained from the tone signal generation time (T0) and the time (t1) when the signal output from the filtering section 15 is changed. The delay amount t is calculated by dividing the obtained value into a status judgement unit N.

Furthermore, the gain is obtained by calculating a level difference ($P_1-P_0$) from the power ($P_0$) of tone signal output from the speaker 4 and the power ($P_1$) at the time the tone output from the filtering section 15 is detected, to adjust the gain value of the echo canceling section 13. Thereby, suitable delay amount t and attenuation amount for the applied circuit can be calculated.

Alternatively, it may be used as the other method to increase the tone signal power output from the speaker at steps, check a clipping condition of analog circuit and set a parameter of the first power control section 10, to determine the attenuation amount G so as not to generate a clip, even if the speech reception voice becomes larger.

Figure 10:
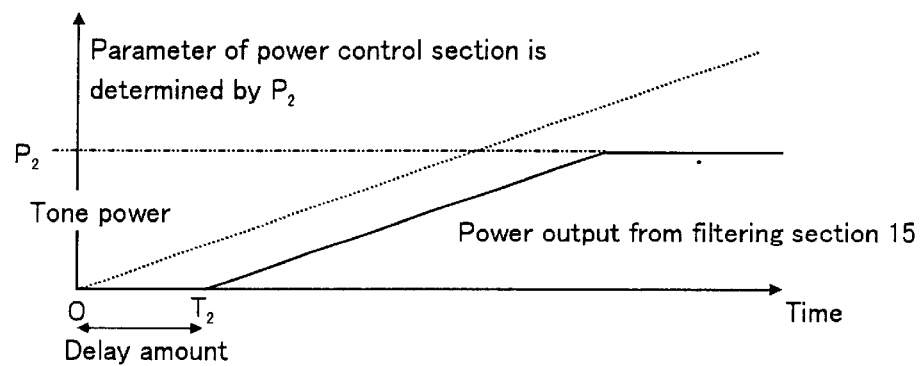
FIG. 10 shows an outline of automatic measurement in a clipping mode of an analog circuit.

That is, as shown in FIG. 10, the outputting tone signal power is gradually increased from "0". Thereby, the signal that is output from the filtering section 15 becomes large according to the tone signal power. However, when a clipping of the signal is generated according to a factor, such as a standard of parts of the analog circuit, the signal output from the filtering section 15 is also clipped, as shown in FIG. 10.

Accordingly, a parameter a of the first power control section 10 is changed based on a tone signal level (P2) at the clipping time. For example, the parameter a can be calculated as follows:

$$\alpha*(P_2-P_{max})=-1.0 \text{ (See FIG. 2)}$$

Thereby, the speech reception voice is suppressed from the time when the clipping occurs in the analog circuit, thus it becomes possible not to generate any clip.

Figure 9:
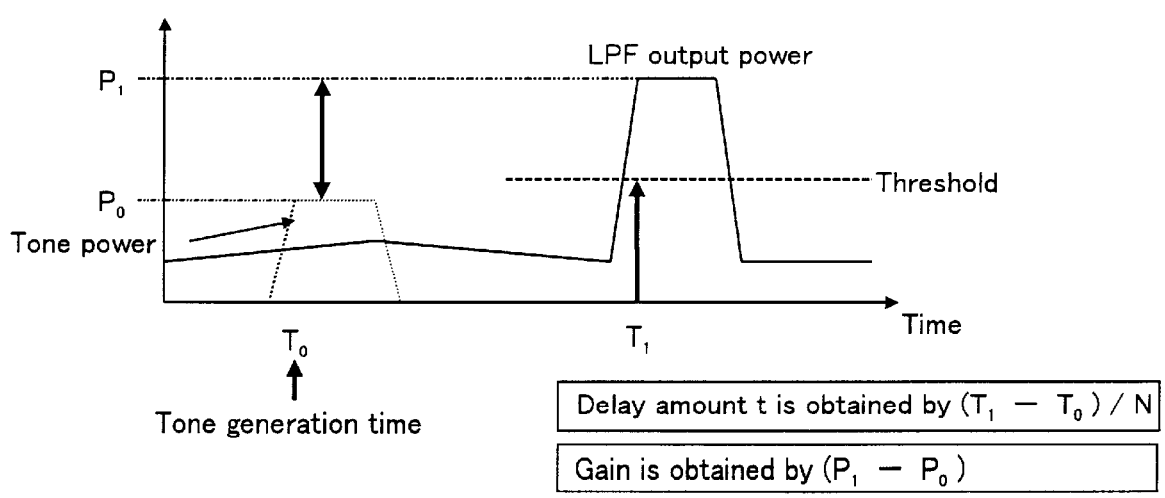
FIG. 9 shows an outline of automatic measurement of delay amount and echo gain by outputting a tone signal.

The method is also applicable to determine the delay amount t and the attenuation amount in the above-described embodiment of FIG. 9.

As described above, it is considered that many background noises are input from the microphone 5 due to the improvement of microphone sensitivity. The background noises have a great influence on the power of the signal (S5) output from the filter section 15 in the state judgement section 16, specially.

Figure 11:
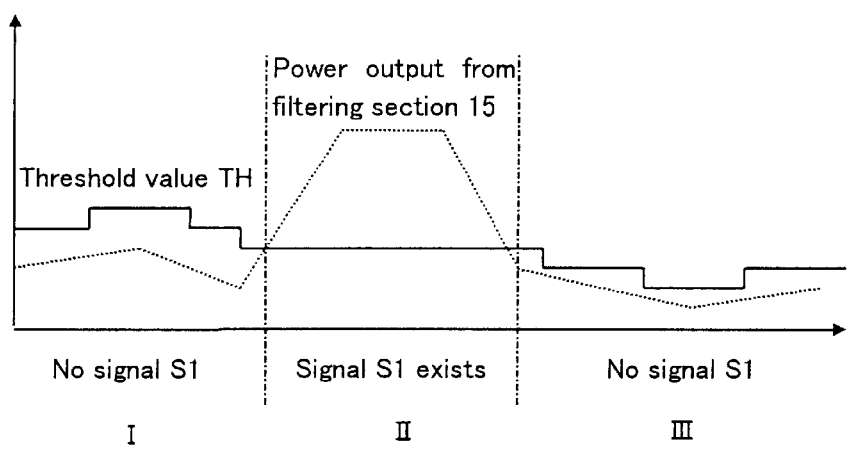
FIG. 11 is an explanation diagram of judgement of voice existence by the use of a variable threshold.

To overcome the shortage, a threshold value is changed according to the signal (S5) output from the filtering section 15, as shown in FIG. 11. When the output signal (S5) is less than the threshold value TH, the threshold value TH is updated from the average power $P_0$ of the output signal (S5) in a previous few of blocks.

When it is judged that the speech transmission voice (S1), which is more than the threshold value TH, exists, as shown in an interval II of FIG. 11, updating the threshold value TH is stopped to prevent the threshold value from increasing by the voice power. During the intervals I and III of FIG. 11, the threshold value TH is changed according to the signal power. Thereby, the threshold value TH can be calculated according to the circumadjacent noise level, thus it makes possible to provide a high accuracy of the detection of speech transmission voice (S1) existence.

Although the threshold value TH is calculated by an average value of the signals (S5) output from a previous few blocks, when the threshold value TH is updated, it is also possible to calculate the value, based on the maximum or minimum value of the signals (S5) output from the previous few blocks.

Figure 12:
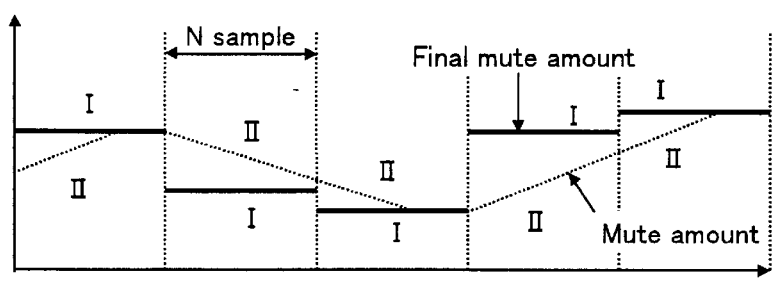
FIG. 12 is an explanatory diagram of controlling and changing a continuous mute amount.

FIG. 12 is an explanatory diagram of the other power control method. In the first and second power control sections 10 and 14, the attenuation amount is gradually changed toward the final mute amount (G), as shown by a broken line II, without attenuating the input signal by the mute amount immediately after calculating the final mute amount (G), as shown by a bold line I. That results the suppression of the immediate change of the output signal and the prevention of deterioration of voice quality. Since the change of inputting to the echo canceling section 13 becomes smooth, the echo canceler can follow easily.

Figure 13:
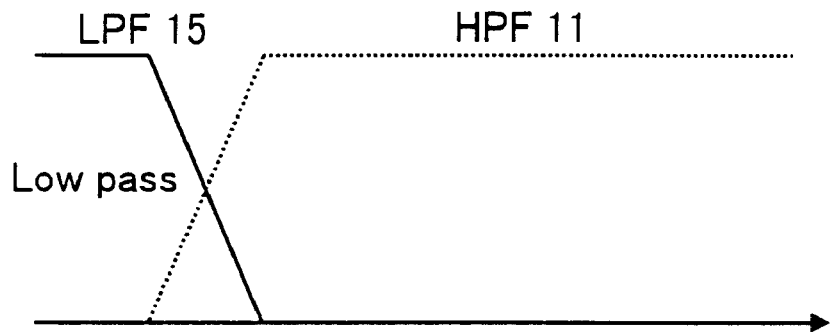
FIG. 13 is an explanatory diagram of one example where the voice existence judgement of a speech transmission voice (S1) is performed by the use of a signal of low frequency component.

As shown in FIG. 13, as filters for judging the existence of speech transmission voice, a high pass filter (HPF) is used as the first filtering section 11, and a low pass filter (LPF) is used as the second filtering section 15. The judgement of existence of the speech transmission voice (S1) is performed by a signal having low frequency components, so as not to give unnatural feeling to the voice output from the speaker.

Figure 14:
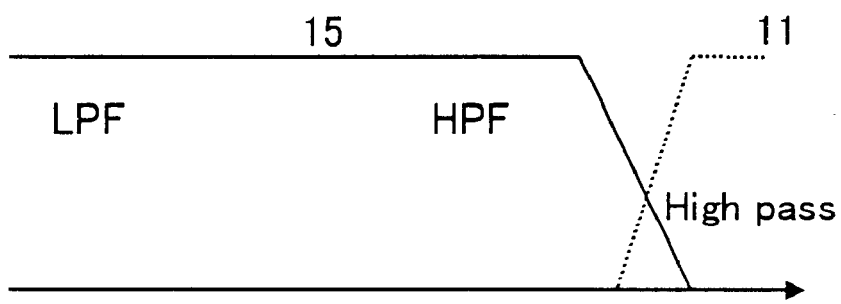
FIG. 14 is an explanatory diagram of the voice existence judgement of the speech transmission voice (S1) is performed by the use of a signal having high frequency components.

On the contrary, as shown in FIG. 14, as filters for judging the existence of speech transmission voice, a low pass filter (LPH) is used as the first filtering section 11, and a high pass filter (HPF) is used as the second filtering section. The judgement of existence of the speech transmission voice (S1) is performed by a signal having high frequency components so as not to give unnatural feeling to the voice output from the speaker.

Figure 15:
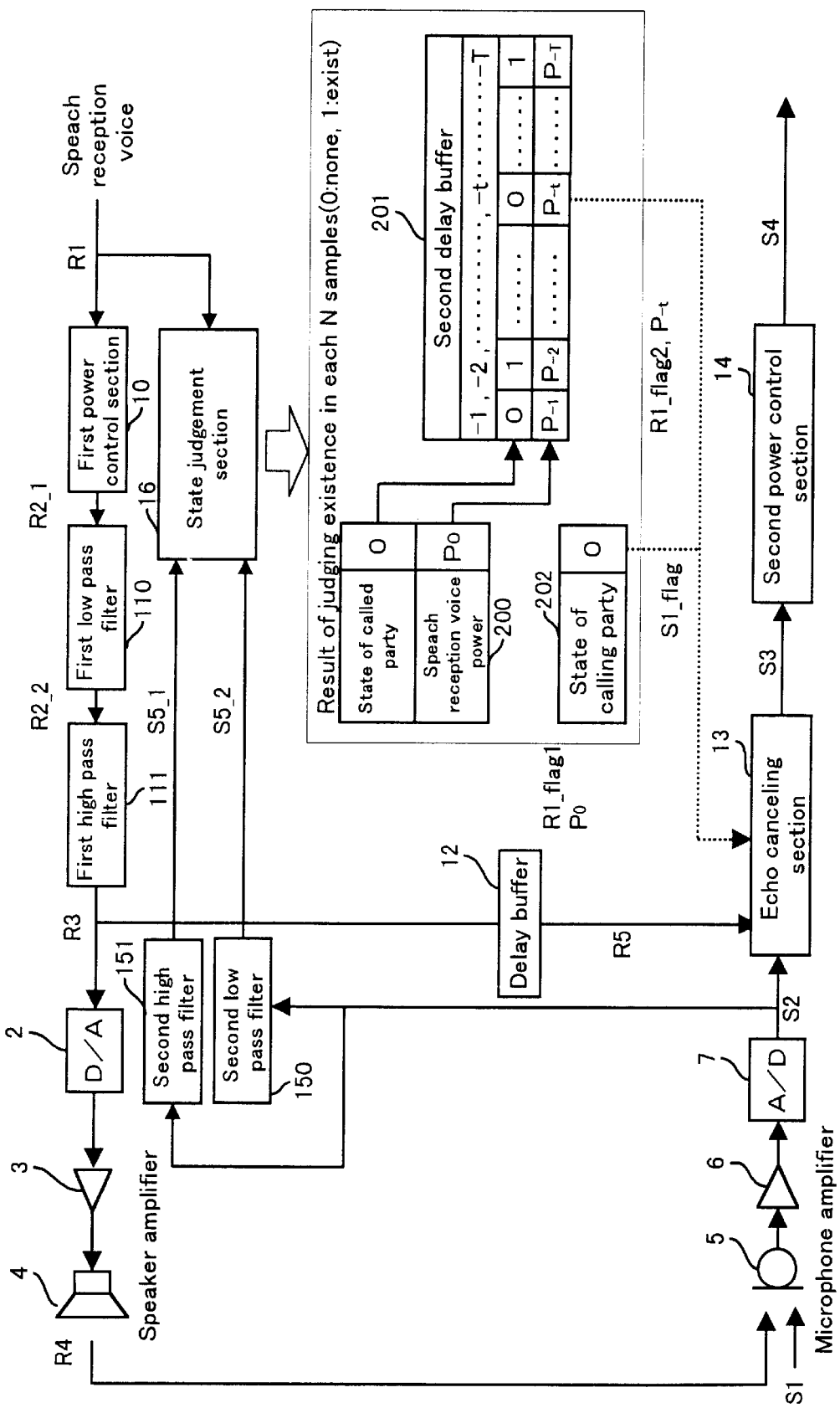
FIG. 15 is a structural block diagram of an echo canceler for providing the voice existence judgement of the speech transmission voice (S1) by the use of both signals having high and low frequency components.

FIG. 15 is a structural block diagram of the echo canceler according to another embodiment of the present invention. In FIG. 15, the first filtering section 11 is formed by a low-pass filter 110 and a high-pass filter 111, and the second filtering section 15 is formed by a low-pass filter 150 and a high-pass filter 151.

In other words, the existence of speech transmission voice is judged by signals having both of the high and low frequency components. Since men's voice includes more low-frequency components and women's voice includes more high-frequency components, a preferable judged result for both men and women can be obtained by detecting by the use of both components.

As is explained above, in the present invention, an echo canceler, whereby the power of speech reception voice can be suitably controlled and distortion of voice output from a speaker, is provided.

Additionally, an echo canceler is provided to improve a stable echo canceling by attenuating a voice input to an echo canceler, varying an attenuation amount, and removing distortion of the voice data.

Alternatively, according to the present invention, an echo canceler for general use, which is not depending on the delay amount and gain of the echo pass, whereby echo pass delay, echo pass gain, clipping state in an analog can be automatically measured.

Therefore, it becomes possible to provide a communication device for keeping a communication quality by applying an echo canceler according to the present invention.

What is claimed is:

1. An echo canceller comprising:

a power control section controlling a power for a speech reception voice;

a first filtering section removing a particular component from an output of the power control section;

an echo canceling section removing echo components of a speech reception voice, which are added to a speech transmission voice;

a second filtering section filtering particular components of the speech transmission voice; and a state judgement section judging existences of the speech reception voice and transmission voice output from the second filtering section and controlling a power attenuation amount of the power control section based on the judgement result, wherein the state judgement section calculating the result of judging whether or not the speech reception and transmission voices exist and a power of the speech reception voice of N samples, based on the speech reception voice and the N samples output from the second filtering section, and there is further comprised of a delay buffer maintaining the calculated result of the judgement section and the power of speech reception voice for T blocks, each block having N samples.

2. The echo canceler according to claim 1, wherein the state judgement section controls to make the power control of the power control section operable, when both the speech reception and transmission voices exist.

3. An echo canceller comprising:

a power control section controlling a power for a speech reception voice;

a first filtering section removing a particular component from an output of the power control section;

an echo canceling section removing echo components of a speech reception voice, which are added to a speech transmission voice;

a second filtering section filtering particular components of the speech transmission voice; and a state judgement section judging existences of the speech reception voice and transmission voice output from the second filtering section and controlling a power attenuation amount of the power control section based on the judgement result, wherein the state judgement section makes the attenuation amount obtained by the power control of the power control section at the time when either of the speech reception or transmission voice does not exist smaller than that at the time when both of the speech reception and transmission voices exist.

4. The echo canceler canceller according to claim 3, wherein the echo canceling section estimates a echo replica according to an attenuated signal obtained by attenuating a signal input to the echo canceling section, amplifies the estimated echo replica according to the attenuation of the input signal, and substrates the estimated echo replica amplified from the input signal.

5. The echo canceller according to claim 4, wherein an attenuation amount for attenuating the signal input of the echo canceling section is determined by a maximum value of volume information set from an external device.

6. The echo canceller according to claim 4, wherein an attenuation amount for attenuating the signal input of the echo canceling section is varied according to volume information set from an external device.

7. The echo canceller according to claim 4, wherein an attenuation amount for attenuating the signal input of the echo canceling section is varied as steps, according to volume information set from an external device, and the attenuation amount varied as steps are stored in a table.

8. The echo canceller according to claim 3, wherein the echo canceling section estimates a echo replica based on an attenuation signal obtained by attenuating a signal input to the echo canceling section, subtracts the estimated echo replica from the attenuation signal, and obtains an amplified signal, which is obtained by amplifying the subtracted signal according to the attenuation of the signal input.

9. The echo canceller according to claim 8, wherein the echo canceling section estimates the echo replica based on the attenuation signal obtained by attenuating the signal input to the echo canceling section, amplifying the estimated echo replica according to the attenuation of the input signal and subtracting the amplified echo replica from the input signal, and there are further comprised of a detection means detecting an existence of noise components in the input signal to the echo canceling section and a selector selecting and outputting the signal obtained by amplifying corresponding to the attenuation of the signal input to the echo canceling section or the signal obtained by subtracting the amplified echo replica from the input signal, according to the existence of noise components detected by the detection means for detecting the noise level.

10. The echo canceller according to claim 1, wherein a number of N samples is variable.

11. The echo canceller according to claim 1, wherein the state judgement section includes a delay buffer, and automatically measures a delay amount of the echo pass and an echo gain by selecting a position of obtaining the N samples from the delay buffer.

12. The echo canceller according to claim 3, wherein there is further comprised of an analog circuit, and the state judgement section detects clipping of the signal in the analog circuit and calculates the attenuation amount of the power control section.

13. The echo canceller according to claim 3, wherein a threshold value judging the existence of speech reception and transmission voices in the state judgement section is varied according to the condition of the existence of speech reception and transmission voices.

14. The echo canceller according to claim 1, wherein the state judgement section varies the power attenuation amount of the power control section in each sample.

15. The echo canceller according to claim 3, wherein a high pass filter is used as the first filtering section and a low pass filter is used as the second filtering section.

16. The echo canceller according to claim 3, wherein a low pass filter is used as the first filtering section and a high pass filter is used as the second filtering section.

17. The echo eaneelef canceller according to claim 3, wherein the first and second filters are respectively formed by low and high pass filters, and the state of the speech transmission voice is judged from the outputs of the low-pass filter and the high pass filter of the second filter.

18. The echo canceller according to claim 4, wherein a residual echo power is reflected, when the echo replica is amplified according to the attenuation of the signal input to the echo canceling section.

19. The echo canceller according to claim 4, further comprising:

a reflecting means for reflecting a residual echo power, when the echo replica is amplified according to the attenuation of the signal input to the echo canceling section; and a selector selecting smaller one of an output obtained by amplifying the echo replica according to the attenuation of the signal input to the echo canceling section or an output from the reflecting means.

* * * * *